(12) United States Patent
Tang (10) Patent No.: US 11,380,358 B2
(45) Date of Patent: Jul. 5, 2022

(54) MAGNETIC RECORDING MEDIA DESIGN WITH REDUCED LATTICE MISMATCH BETWEEN ADJACENT INTERMEDIATE LAYERS

(71) Applicant: Western Digital Technologies, Inc., San Jose, CA (US)

(72) Inventor: Kai Tang, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 21 days.

(21) Appl. No.: 16/912,577

(22) Filed: Jun. 25, 2020

(65) Prior Publication Data

US 2021/0407542 A1 Dec. 30, 2021

(51) Int. Cl.
*G11B 5/73* (2006.01)
*G11B 5/65* (2006.01)
*G11B 5/851* (2006.01)

(52) U.S. Cl.
CPC ............ *G11B 5/737* (2019.05); *G11B 5/653* (2013.01); *G11B 5/656* (2013.01); *G11B 5/736* (2019.05); *G11B 5/73919* (2019.05); *G11B 5/851* (2013.01); *G11B 5/7379* (2019.05)

(58) Field of Classification Search
None
See application file for complete search history.

(56) References Cited

U.S. PATENT DOCUMENTS

| | | | | |
|---|---|---|---|---|
| 6,383,667 B1 * | 5/2002 | Futamoto | ............... | G11B 5/656 428/836.3 |
| 6,811,890 B1 * | 11/2004 | Zhou | ............... | G11B 5/66 428/336 |
| 7,175,925 B2 | 2/2007 | Chen et al. | | |
| 7,736,767 B2 | 6/2010 | Bian et al. | | |
| 7,833,640 B2 * | 11/2010 | Marinero | ............... | G11B 5/737 428/831.2 |
| 8,202,636 B2 | 6/2012 | Choe et al. | | |

(Continued)

OTHER PUBLICATIONS

Li et al., "Influence of Intermediate Layer on Magnetic Properties of L10 Ordered FePt Perpendicular Recording Media"; IEEE Transactions on Magnetics; vol. 46, Issue 6; Jun. 2010; https://ieeexplore.ieee.org/document/8692750; 2 pages.

(Continued)

*Primary Examiner* — Kevin M Bernatz
(74) *Attorney, Agent, or Firm* — Loza & Loza, LLP; Gabriel Fitch (57) ABSTRACT

Magnetic recording media including an interlayer configured to reduce lattice mismatch with adjacent layers of the media, such as an adjacent seed layer or an adjacent underlayer. In one example, an interlayer alloy is provided that includes tungsten (W) along with Cobalt (Co), Chromium (Cr), and Ruthenium (Ru). The atomic percentages of W and Ru within the interlayer are selected so that the amount lattice mismatch between the interlayer and its adjacent layers is below a preselected amount, such as below 3% as quantified by d-spacing. In some examples, the atomic percentage of Ru is greater than 25% and the atomic percentage of W is 2-10%. Methods of fabricating the magnetic recording media are also provided.

24 Claims, 8 Drawing Sheets

(56) References Cited

U.S. PATENT DOCUMENTS

| | | | |
|---|---|---|---|
| 8,758,912 B2* | 6/2014 | Srinivasan | G11B 5/8404 |
| | | | 428/831 |
| 9,659,592 B2* | 5/2017 | Ataka | G11B 5/85 |
| 9,685,184 B1* | 6/2017 | Srinivasan | G11B 5/64 |
| 9,940,963 B1 | 4/2018 | Tang | |
| 2002/0127435 A1* | 9/2002 | Uwazumi | G11B 5/73923 |
| | | | 428/833 |
| 2005/0084669 A1 | 4/2005 | Girt et al. | |
| 2006/0275629 A1 | 12/2006 | Ikeda et al. | |
| 2009/0011281 A1* | 1/2009 | Oikawa | G11B 5/667 |
| | | | 428/812 |
| 2012/0021254 A1* | 1/2012 | Kuboki | G11B 5/737 |
| | | | 428/828 |
| 2012/0219827 A1* | 8/2012 | Kim | G11B 5/82 |
| | | | 428/828.1 |
| 2015/0029830 A1* | 1/2015 | Zhang | G11B 5/65 |
| | | | 369/13.4 |
| 2015/0162043 A1* | 6/2015 | Oyama | G11B 5/65 |
| | | | 428/828.1 |

OTHER PUBLICATIONS

Shinohara et al., "High SNR perpendicular recording media"; Journal of Magnetism and Magnetic Materials; vol. 134, Issues 2-3; Jun. 1994; https://www.sciencedirect.com/science/article/abs/pii/0304885394002533; 2 pages.

* cited by examiner

MAGNETIC RECORDING MEDIA DESIGN WITH REDUCED LATTICE MISMATCH BETWEEN ADJACENT INTERMEDIATE LAYERS

FIELD

Aspects of the present disclosure relate to magnetic recording media designs, and more specifically to perpendicular magnetic recording media designs having various intermediate layers.

INTRODUCTION

Increasing the recording density of hard disk drives (HDDs) is becoming ever more challenging. Two key approaches to increasing the areal density capacity (ADC) of HDDs have included increasing the media signal-to-noise ratio (SNR), which leads to an increase in the linear density of the recording bits, and reducing the track width, which leads to an increase in the recording track density. Media structure designs that utilize an exchange-coupled composite have proven to be effective at increasing the ADC. In such media structures, magnetic recording sublayers and non-magnetic exchange control sublayers (ECLs) are deposited in an alternating fashion. The magnetic recording sublayers store the magnetic information, while the ECLs provide vertical decoupling between adjacent magnetic sublayers to reduce noise and improve media writability, allowing optimum balance between media SNR, writability and thermal stability. The magnetic recording layers may be formed on top of a seed layer and various intermediate layers. Issues may arise due to lattice mismatches between the various layers. For example, lattice mismatches between the intermediate layers and the seed layer may result in generally poor crystallographic texture and poor selection of alloy composition of the intermediate layers may lead to larger grain size within the magnetic recording layers, which can reduce the SNR and the ADC of the resulting media.

SUMMARY

One aspect of the present disclosure provides a magnetic recording medium configured to store information that includes: a substrate, a seed layer on the substrate; an interlayer on the seed layer, wherein the interlayer includes cobalt (Co), chromium (Cr), and ruthenium (Ru) and an additional metal selected from a group consisting of tungsten (W), tantalum (Ta), molybdenum (Mo), and Niobium (Nb); an underlayer on the interlayer; and one or more magnetic recording layers on the underlayer; wherein a lattice mismatch between the interlayer and one or both of the seed layer and the underlayer is below a preselected amount. The magnetic recording medium may additionally include, e.g., a soft underlayer (SUL) and an overcoat.

Another aspect of the present disclosure provides a method for fabricating a magnetic recording medium. The method includes: providing a substrate; providing a SUL on the substrate; providing a seed layer on the SUL; providing an interlayer on the seed layer, wherein the interlayer includes Co, Cr, and Ru and an additional metal selected from a group consisting of W, Ta, Mo, and Nb; providing an underlayer on the interlayer; and providing one or more magnetic recording layers on the underlayer; and wherein the interlayer is provided so that a lattice mismatch between the interlayer and one or both of the seed layer and the underlayer is below a preselected amount.

Yet another aspect of the present disclosure provides a magnetic recording medium that includes: a seed layer; an interlayer on the seed layer; an underlayer on the interlayer; and one or more magnetic recording layers on the underlayer; wherein the interlayer comprises cobalt (Co), chromium (Cr), and ruthenium (Ru) and an additional metal selected from a group consisting of tungsten (W), tantalum (Ta), molybdenum (Mo), and Niobium (Nb), and wherein a percentage of the additional metal in the interlayer is selected to reduce a lattice mismatch between an adjacent layer and the interlayer as compared to a corresponding lattice mismatch between the adjacent layer and the interlayer without the additional metal.

DETAILED DESCRIPTION

Perpendicular magnetic recording (PMR) media may include soft underlayer (SUL), a seed layer, an interlayer, an underlayer, and one or more magnetic recording layers. In some examples, the magnetic recording layers of perpendicular media should be in a <0001> crystallographic orientation and have small and magnetically-isolated grains. The seed layer may have a Face Centered Cubic (FCC) structure in a <111> orientation. The seed layer establishes a foundation for the final <0001> crystallographic texture growth of the magnetic recording layers, which are formed above the intervening interlayer and underlayer. That is, the grain size of the various layers below the magnetic recording layers affects the grain size of the magnetic recording layers since each layer is grown upon the layer below. For example, the interlayer, formed on the seed layer, may be provided to promote lattice matching between the seed layer and the underlayer, which in turn helps to maintain proper crystallographic texture of the magnetic recording layers. (Crystallographic texture generally refers to the distribution of crystallographic orientations of a polycrystalline structure.) The underlayer may be, for example, ruthenium (Ru), which is sputter deposited onto the interlayer to achieve a desired grain size and topography to facilitate growth of small magnetically-decoupled grains within the magnetic recording layers that are grown on the underlayer.

The crystallographic texture of the interlayer and the subsequently-deposited underlayer tends to improve with increasing interlayer thickness. However, the grain size of the interlayer tends to increase with layer thickness, which can lead to increased media noise. That is, a thicker interlayer promotes proper crystallographic characteristics of the magnetic recording layers, but the larger grain sizes occurring within a thicker interlayer can cause an increase in media noise. One reason that the grain size increases with thicker layers is that, as the layer is grown, each grain of crystals tends to grow laterally while it grows vertically, i.e. the grains widen with height. Hence, a thicker interlayer layer will have wider grains at its top surface, which promotes larger grains in the underlayer grown atop the interlayer. This, in turn, results in larger grains in the magnetic recording layers. It is noted that, although a thinner interlayer can promote smaller grain sizes within the magnetic recording layers, crystallographic texture may suffer if the layer is too thin. In some examples, a thickness of about 40 angstroms (Å) is desired.

Herein, methods and materials are disclosed for maintaining small grain size within the interlayer while also achieving proper crystallographic characteristics of the underlayer and the magnetic recording layers. This, in turn, can help improve signal-to-noise ratio (SNR) and areal density capacity (ADC). In some examples, the methods and materials serve to provide a lattice mismatch between the interlayer and its adjacent layers that is below a preselected amount, such as below a 3% mismatch. The small lattice mismatch promotes proper crystallographic orientations of the underlayer and the magnetic recording layers while achieving small grain size in combination with proper alloy composition selection. In one example, an interlayer is provided that includes tungsten (W) along with Cobalt (Co), Chromium (Cr), and a suitable amount of Ru. The atomic percentages of W and Ru in the interlayer may be selected so that the lattice mismatch between the interlayer and the underlayer and/or the seed layer is below the preselected amount. (An atomic percentage represents the number of atoms of an element per one hundred atoms of a substance in which the element is a component.) In some examples, the atomic percentage of Ru is 25% or more. An Ru atomic percentage of less than 25% may result in a lattice mismatch between the interlayer and underlayer that is too high (e.g. not less than 3%). The addition of W tends to reduce the grain size of the interlayer and, at the same time, reduces lattice mismatch to achieve good crystallographic texture of the magnetic recording layers. In some examples, the W added to the interlayer also acts like a segregant.

In some examples, other metals besides W may be used in the interlayer. Generally speaking, other metals may be used so long as the presence of the additional metal (1) maintains the crystal structure of seed layer (which is beneath the interlayer); (2) provides for a preselected lattice mismatch (between interlayer and the seed layer and between the interlayer and the underlayer); (3) contains and/or reduces lateral grain growth; and (4) provides for a close packed atomic plane just below the underlayer.

Before describing in detail methods and materials that provide for a reduced or minimal lattice mismatch, a disk drive using magnetic recording media will be described.

Figure 1:
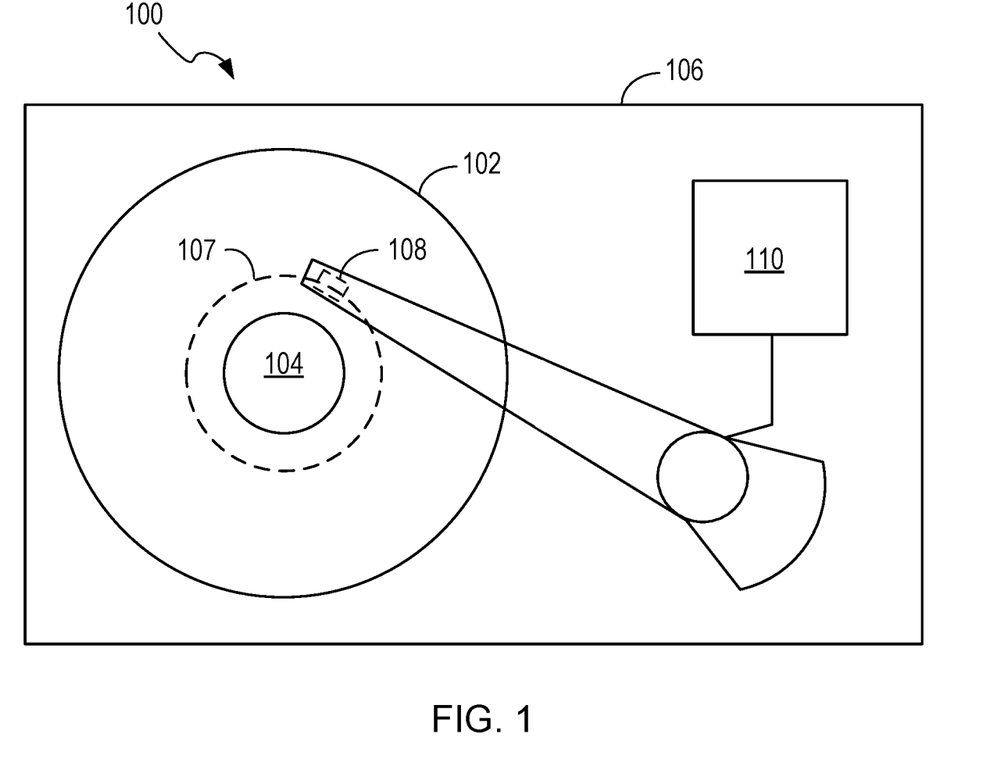
FIG. 1 is a top schematic view of a data storage device configured for magnetic recording and including a magnetic recording medium with an interlayer configured to reduce lattice mismatch with adjacent layers in accordance with one embodiment of the disclosure.

FIG. 1 is a top schematic view of a data storage device (e.g., disk drive) 100 configured for magnetic recording and including a magnetic recording medium 102 with a magnetic recording layer structure including at least six magnetic recording sublayers and at least five non-magnetic exchange control sublayers arranged in an alternating fashion in accordance with one embodiment of the disclosure. In some examples, the magnetic recording medium 102 may include a perpendicular magnetic recording (PMR) medium, a heat assisted magnetic recording (HAMR) medium, or a microwave assisted magnetic recording (MAMR) medium.

Disk drive 100 may include one or more disks/media 102 to store data. Disk/media 102 resides on a spindle assembly 104 that is mounted to drive housing 106. Data may be stored along tracks 107 in the magnetic recording layer of disk 102. The reading and writing of data are accomplished with the head/slider 108 that may have both read and write elements. The write element is used to alter the magnetization direction of the magnetic recording layer of disk 102 and thereby write information thereto. In one embodiment, head 108 may have magneto-resistive (MR), giant magneto-resistive (GMR), or tunnel magneto-resistive (TMR) elements. In another embodiment, head 108 may be another type of head, for example, a Hall effect head. In operation, a spindle motor (not shown) rotates the spindle assembly 104, and thereby rotates disk 102 to position head 108 at a particular location along a desired disk track 107. The position of head 108 relative to disk 102 may be controlled by position control circuitry 110 of the disk drive 100.

Figure 2:
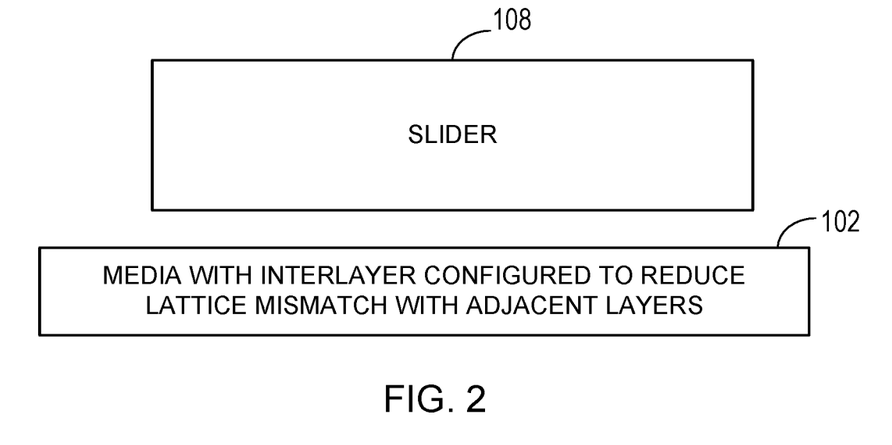
FIG. 2 is a side cross sectional schematic view of selected components of the data storage device of FIG. 1 including the magnetic recording medium with the interlayer configured to reduce lattice mismatch in accordance with an embodiment of the disclosure.

FIG. 2 is a side cross-sectional schematic view of selected components of the data storage device of FIG. 1 including the magnetic recording medium 102 with an interlayer configured to reduce lattice mismatch with adjacent layers in accordance with an embodiment of the disclosure. The head/slider 108 is positioned above the medium 102. The head/slider 108 includes a write element and a read element (not shown) positioned along an air bearing surface (ABS) of the slider (e.g., bottom surface) for writing information to, and reading information from, respectively, the medium 102. FIGS. 1 and 2 illustrate a specific example of a magnetic recording system. In other examples, embodiments of the improved media with the layer structures and compositions disclosed herein can be used in other suitable magnetic recording systems.

Figure 3:
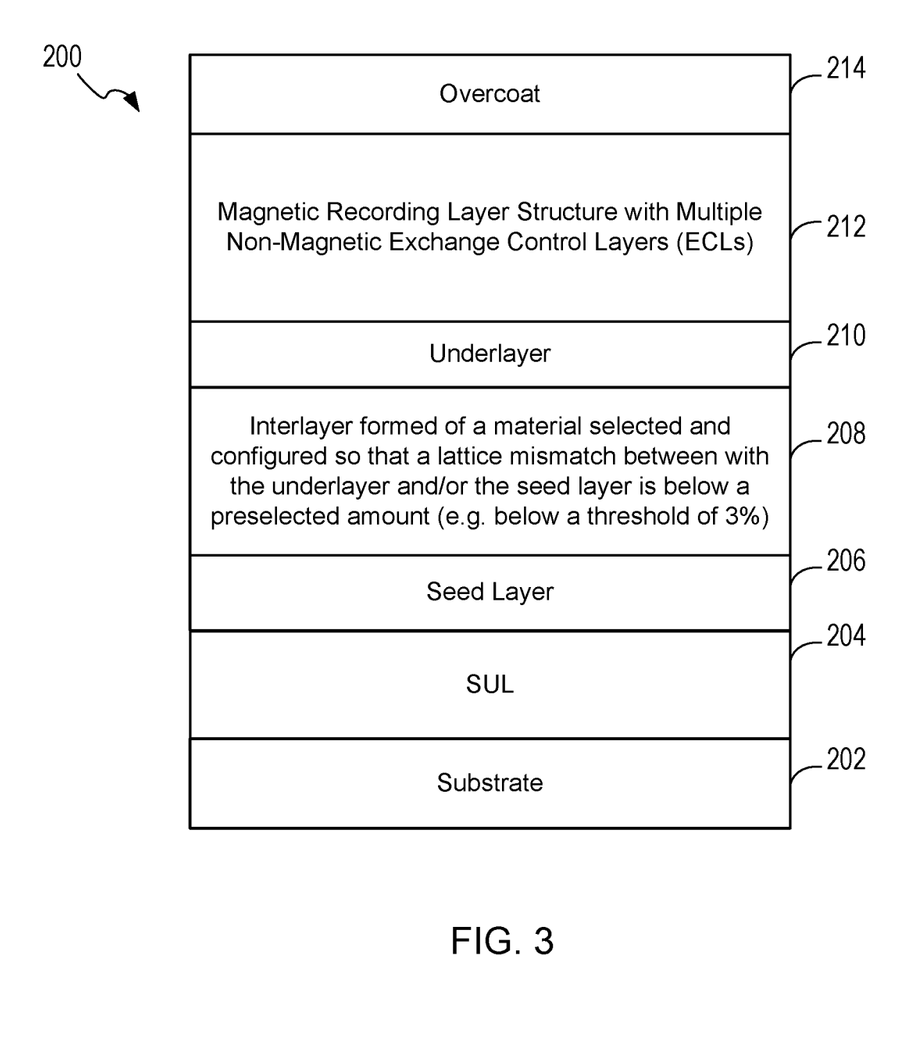
FIG. 3 is side cross-sectional schematic view of a magnetic recording medium having an interlayer configured to reduce lattice mismatch with adjacent layers in accordance with an embodiment of the disclosure.

FIG. 3 is side cross-sectional schematic view of a magnetic recording medium 200 that, in some embodiments, can be used in conjunction with the disk drive 100 of FIGS. 1 and 2. In sequence from the bottom, the medium 200 includes a substrate 202, an SUL 204, a seed layer 206, an interlayer 208, an underlayer 210, a magnetic recording layer structure 212, and an overcoat layer 214. The magnetic recording layer structure 212 may have multiple magnetic recording layers and multiple non-magnetic exchange control layers.

The substrate 202 can be made of one or more materials such as an aluminum (Al) alloy, Nickel Platinum (NiP)-plated Al, glass, glass ceramic, and/or combinations thereof. The SUL 204 can be made of one or more materials, such as cobalt (Co), iron (Fe), molybdenum (Mo), tantalum (Ta), niobium (Ni), boron (B), chromium (Cr), or other soft magnetic materials, or combinations thereof. In one aspect, the SUL 204 may include an amorphous compound or combination of Co, Fe, Mo, and Nb (CoFeMoNb). The SUL 204 may be configured to support magnetization of the magnetic recording layer structure 212 during data storage operations. The seed layer 206 can be made of one or more materials, such as those containing elements of Ni, W, Fe, Cr, Al, combinations thereof, and/or other suitable materials known in the art. In one aspect, the seed layer 206 may include a combination of Ni, Fe, W, and Al (NiFeWAl).

The interlayer 208 may be formed of a material selected and configured so that a lattice mismatch between the interlayer 208 and the underlayer 210 and/or the seed layer 206 is below a preselected amount, such as below a 3% mismatch threshold. Other suitable thresholds may be in the range of 1-3%. The use of d-spacing for quantifying an amount of lattice mismatch is discussed below. In some examples, the lattice mismatch threshold between the interlayer 208 and the underlayer 210 may differ from the lattice mismatch threshold between interlayer 208 and the seed layer 206. As noted above, a reduced lattice mismatch promotes proper crystallographic orientations of the underlayer 210 and the magnetic layers of magnetic recording layer structure 212 while achieving small grain size in combination with proper alloy composition selection.

By "selected and configured," it is meant that the materials for use within the interlayer are selected, their atomic percentages are selected, and/or their particular lattice orientations are selected. For example, the interlayer 208 may include W, Co, Cr, and Ru in <111> orientation of a FCC-phase or <0001> orientation of a HCP-phase, with the atomic percentage of W set to 5% so that the amount lattice mismatch between the interlayer and both the underlayer and the seed layer is below 3%. If a different additional metal is selected besides W, such as tantalum (Ta), molybdenum (Mo), Niobium (Nb), or Rhenium (Re), the atomic percentage to use for that metal may differ from that of W. If a different orientation is selected, the materials to use and their atomic percentages may differ. If the materials and orientations of the adjacent layers differ, the materials to use in the interlayer, their atomic percentages and orientations may also differ. Moreover, it should be understood that not all of W, Ta, Mo, Nb or Re will necessarily serve to reduce a lattice mismatch in a particular magnetic recording medium below a desired threshold and not all of these elements have been tested in combination with CoCrRuW. Whether a particular lattice mismatch can be achieved in a particular magnetic recording medium using a particular metal additive depends, e.g., on the materials and orientations of the adjacent layers to the interlayer and on the materials and orientations of the interlayer.

Routine experimentation may be performed to identify particular materials, atomic percentages, orientations, etc., that serve to achieve a desired lattice mismatch (e.g. <3%) in a particular magnetic recording medium, if such a low mismatch is indeed achievable in that magnetic recording medium. Given the particular materials of the adjacent layers and their orientations, a desired lattice mismatch (e.g. <3%) cannot always be achieved. Below, particular alloys, atomic percentages, and crystal orientations are described that achieve a lattice mismatch of less than 3% in at least in some magnetic recording media. In other examples, rather than maintaining the lattice mismatch below a lattice mismatch threshold, maximum lateral grain size growth may be kept below a predetermined lateral grain size growth threshold.

Figure 4:
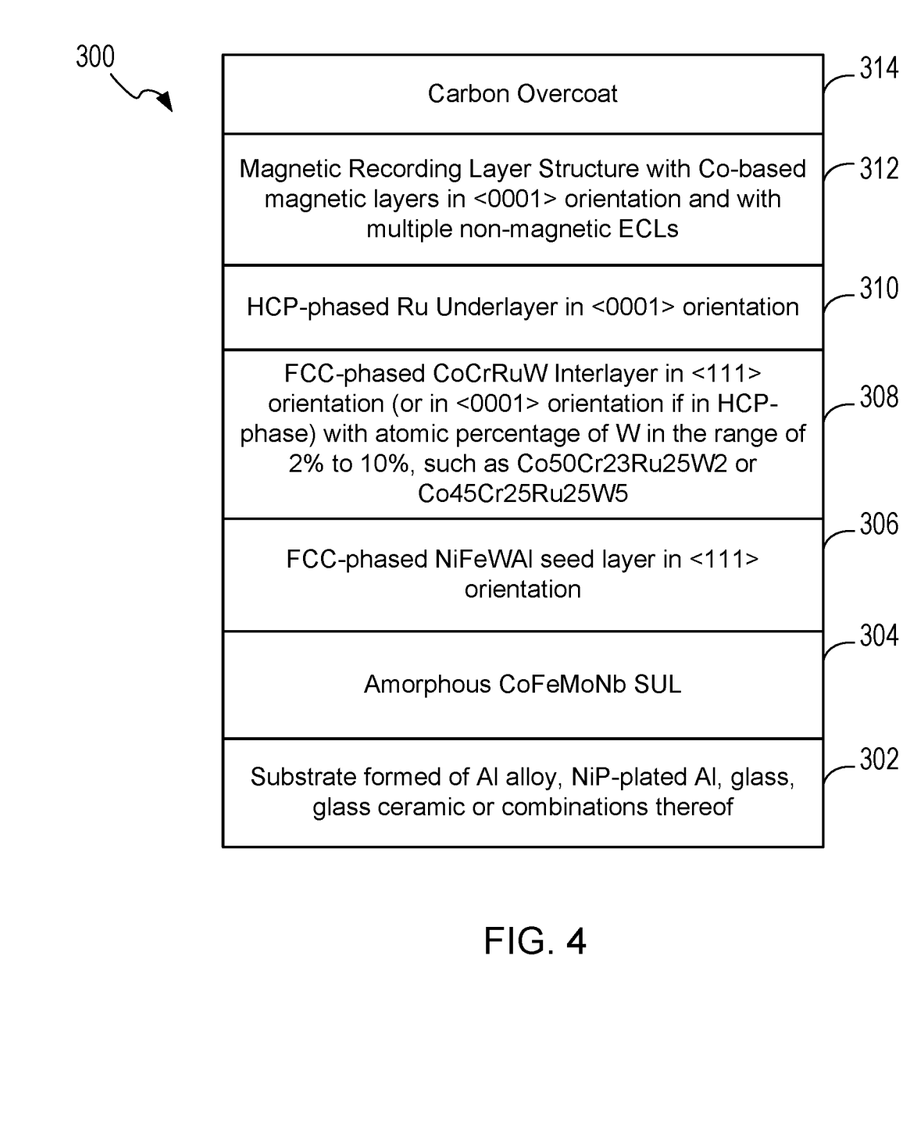
FIG. 4 is side cross-sectional schematic view of another magnetic recording medium having an interlayer configured to reduce lattice mismatch with adjacent layers in accordance with an embodiment of the disclosure.

FIG. 4 provides is side cross-sectional schematic view of a magnetic recording medium 300 that, in some embodiments, can be used in conjunction with the disk drive 100 of FIGS. 1 and 2. FIG. 4 illustrates further details regarding particular exemplary embodiments configured so that the lattice mismatch between an interlayer and its adjacent layers is below a preselected amount. As with the medium of FIG. 3, the magnetic recording medium 300 includes a substrate 302, an SUL 304, a seed layer 306, an interlayer 308, an underlayer 310, a magnetic recording layer structure 312, and an overcoat layer 314. The magnetic recording layer structure 312 may have multiple magnetic recording layers and multiple non-magnetic exchange control layers.

The substrate 302, in the example of FIG. 3, is formed of Al alloy, NiP plated Al, glass, glass ceramic or combinations thereof. In one embodiment, the substrate 302 is a glass substrate. The SUL 304, in the example of FIG. 3, is amorphous CoFeMoNb. The seed layer 306 is an FCC-phased NiFeWAl seed layer in <111> orientation. The interlayer 308, in the example of FIG. 3, is an FCC-phased CoCrRuW interlayer in <111> orientation, with the atomic percentage of W in the range of 2 to 10% and with an atomic percentage of Ru of at least 25%. Alternatively, if the interlayer 308 is in hexagonal close packed (HCP) phase, then its orientation is <0001>.

The particular amount of W to employ within the interlayer 308 may depend on the materials and configurations of the adjacent layers (seed layer 306 and underlayer 310) as well as the relative amounts of Co, Cr, and Ru in the interlayer 308. In a particular example, the FCC-phased interlayer 308 consists of 5% W, 45% Co, 25% Cr, and 25% Ru (Co45Cr25Ru25W5). In another particular example, the composition is 2% W, 50% Co, 23% Cr, and 25% Ru (Co50Cr23Ru25W2). The underlayer 310, in the example of FIG. 3, is an HCP-phased Ru underlayer in <0001> orientation. Note that as the underlayer is formed, its atoms typically only "see" (i.e., are influenced by) the atoms immediately below in the interlayer. Hence, so long as the top surface of the interlayer has a close-packed atomic plane arrangement, an HCP underlayer will grow in <0001> orientation.

The magnetic recording layer structure 312, in the example of FIG. 4, is composed of Co-based magnetic layers with multiple ECLs grown on top of Ru underlayer in the structure 312 in the <0001> orientation. In some examples, six magnetic layers are interleaved with five ECLs, which collectively form the magnetic recording layer. In other examples, more or fewer ECLs may be formed. The ECLs are non-magnetic or weakly magnetic materials provided to help break exchange coupling vertically between layers (or otherwise control such coupling) and to help achieve grain isolation of the magnetic recording layers. Additional information regarding an exemplary magnetic recording layer is discussed below in connection with FIG. 5. The overcoat 314, in the example of FIG. 4 is formed of C.

Insofar as lattice matching is concerned, in order to achieve good crystallographic texture of the magnetic recording layer structure 312, proper lattice matching between the interlayer 308 and the underlayer 310 and the seed layer 306 is important with any lattice mismatch at or below 3%. Since the relevant layers are close-packed crystallographic structures (FCC or HCP), their d-spacing (i.e. the spacing between the atoms) in the direction perpendicular to the media plane can be used as a practical measure of the degree or amount of lattice mismatch between layers. That is, lattice mismatch between two layers may be quantified based on a difference between the d-spacing of the layers (in the perpendicular direction). For example, the d-spacing of interlayer minus the d-spacing of the seed layer may be used to quantify the lattice mismatch between the interlayer and the seed layer. The difference may be expressed as a percentage difference as well. For example, $((\text{d-spacing}_{interlayer} - \text{d-spacing}_{seed\ layer})/\text{d-spacing}_{seed\ layer})*100$ may be used as the lattice mismatch percentage. Note that the mismatch between non-adjacent layers may be determined and exploited as well, such as a mismatch between the seed layer and the underlayer. For example, the interlayer may be configured so that the d-spacing mismatch between the interlayer and the seed layer and the d-spacing mismatch between the interlayer and the underlayer are both reduced below some suitable threshold.

In the example of FIG. 4, the underlayer 310, which is formed of Ru, has a relatively large lattice parameter, resulting in a large d-spacing of 1.065 Å. In order to have an interlayer d-spacing within 3% from the Ru underlayer d-spacing of 1.065 Å, the minimum Ru % in the interlayer should be at least 25%. For example, 25% Ru results in 1.045 Å d-spacing in the interlayer. The range of Ru % should be from 25-40% to have good lattice matching with layers both above and below the interlayer 308. The range of Cr % should be 20-30%. The range of Co % should be 30-50%. The range of W % should be 2-10%.

Note that the addition of W into the interlayer 308 increases d-spacing of the interlayer, making Co45Cr25Ru25W5 a good match to the lattices of the Ru underlayer 310 and the NiFeWAl seed layer 306. It is noted that the inclusion of W in the interlayer can also provide better corrosion resistance as compared to a similar interlayer without W.

Table I provides exemplary d-spacing parameters for various layers for a structure where the interlayer is the quandary alloy Co45Cr25Ru25W5 and for an alternative structure without W where the interlayer is a ternary alloy Co50Cr25Ru25. The data shows somewhat larger d-spacing of the Co45Cr25Ru25W5 interlayer as opposed to the Co50Cr25Ru25 interlayer. In this example, the larger d-spacing of the Co45Cr25Ru25W5 interlayer (1.045 Å) reduces the lattice mismatch with the Ru underlayer (which has a d-spacing of 1.065 Å), as compared to the lattice mismatch observed in the case of Co50Cr25Ru25. In particular, the lattice mismatch for Co45Cr25Ru25W5 between the interlayer and the underlayer is about 1.9%, which is well-below the threshold of 3% and also below a lower threshold of 2%. In this example, the lattice mismatch between the interlayer and the seed layer is also reduced in Co45Cr25Ru25W5 as compared to Co50Cr25Ru25. That is, the lattice mismatch between the interlayer and the underlayer and between the interlayer and the seed layer are both reduced (as compared to Co50Cr25Ru25) with the addition of W5%.

TABLE I

| Co50Cr25Ru25 | Co45Cr25Ru25W5 |
|---|---|
| Co-based Magnetic layers: | Co-based Magnetic layers: |
| d-spacing of (0004) of Co-alloys: 1.048 Å | d-spacing of (0004) of Co-alloys: 1.048 Å |
| Ru Underlayer: | Ru Underlayer: |
| d-spacing of (0004) of Ru: 1.065 Å | d-spacing of (0004) of Ru: 1.065 Å |
| Co50Cr25Ru25 Interlayer: | Co45Cr25Ru25W5 interlayer |
| d-spacing of (0004) or (222) of Co50Cr25Ru25: 1.037 Å | d-spacing of (0004) or (222) of Co45Cr25Ru25W5: 1.045 Å |
| Seed layer: | Seed layer: |
| d-spacing of (222) of NiFeWAl: 1.042 Å | d-spacing of (222) of NiFeWAl: 1.042 Å |

Table II summarizes media SNR values from a media component test that compares the example where the interlayer composition is Co50Cr23Ru25W2 with a media having Co50Cr25Ru25 as the interlayer. As shown in Table II, values for wsSNRinitial, wsSNRfinal, and $SNR_{2T}$ are all higher by 0.1 dB for the W-based example compared to the non-W-based example. In the table, note that MCW refers to magnetic core width, OW2 refers to a reverse overwrite test, wsSNRinitial refers to an initial weighted-sum SNR, wsSNRfinal refers to a final weighted-sum SNR, $SNR_{2T}$ refers to SNR at half of the maximum linear density, and $AD_{OTC}$ refers to areal density capacity.

TABLE II

| Interlayer Composition | MCW nm | OW2 dB | RES % | $wsSNR_{initial}$ dB | $wsSNR_{final}$ dB | $SNR_{2T}$ dB | $AD_{OTC}$ Gb/in² |
|---|---|---|---|---|---|---|---|
| Co50Cr23Ru25W2 | 55.1 | 31.1 | 44.4 | 11.7 | 10.4 | 6.3 | 927 |
| Co50Cr25Ru25 | 55.3 | 31.9 | 43.9 | 11.6 | 10.3 | 6.2 | 924 |

Table III summarizes X-ray rocking angle test measurements that compare the example where the interlayer composition is Co50Cr23Ru25W2, with an alternative media without W where the interlayer composition is Co50Cr25Ru25. As shown in Table III (which shows magnitudes measured using 0004 reflections), the W-based example yields similar crystallographic textures to that of the media without W. That is, the addition of W does not significantly change the crystallographic texture, while still providing the SNR and ADC improvements noted above.

TABLE III

| Interlayer Composition | Magnitude (0004) |
|---|---|
| Co50Cr23Ru25W2 | 2.82 |
| Co50Cr25Ru25 | 2.81 |

Figure 5:
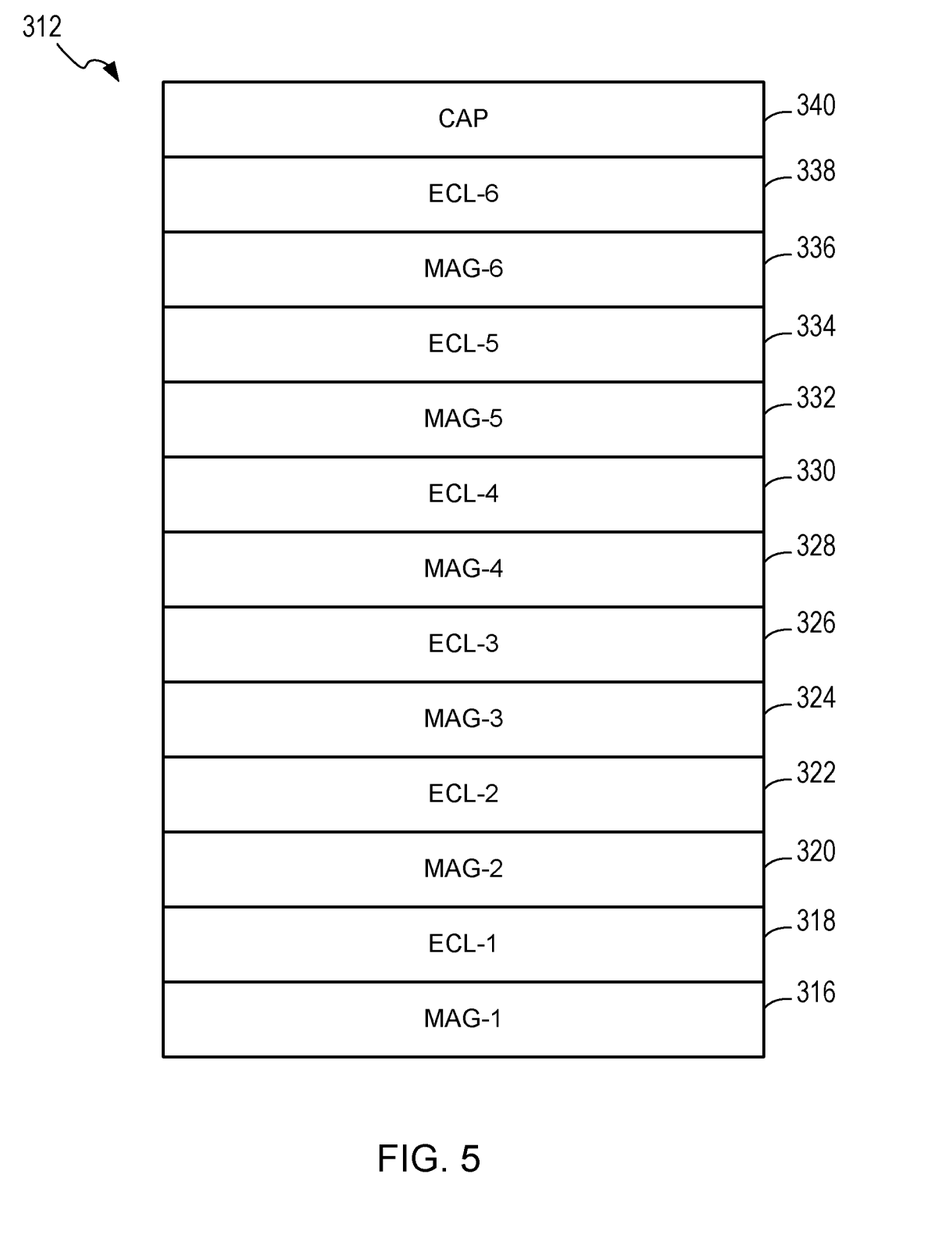
FIG. 5 is a side cross sectional view of a magnetic recording layer structure having six magnetic recording sublayers and six non-magnetic exchange control sublayers in accordance with one embodiment of the disclosure.

FIG. 5 is side cross-sectional schematic view of the magnetic recording structure 312 of FIG. 4 or other magnetic recording layers discussed herein. The magnetic recording layer structure 312 includes six magnetic recording sublayers 316, 320, 324, 328, 332, and 336 (denoted MAG-1, MAG-2, MAG-3, MAG-4, MAG-5, and MAG-6) and six non-magnetic exchange control sublayers 318, 322, 326, 330, 334, and 338 (denoted ECL-1, ECL-2, ECL-3, ECL-4, ECL-5, and ECL-6) arranged in an alternating pattern. In the example shown in FIG. 5, MAG-1 is the bottom magnetic recording sublayer (e.g., the magnetic recording sublayer nearest the substrate, shown in FIG. 4), while MAG-6 is the top magnetic recording sublayer (e.g., the magnetic recording sublayer furthest from the substrate, shown in FIG. 4).

Each of the magnetic recording sublayers 316, 320, 324, 328, 332, and 336 can be made of one or more magnetic materials grown in the <0001> orientation, such as Co alloys, or other magnetic materials suitable for storing information magnetically. In some examples, each of the magnetic recording sublayers 316, 320, 324, 328, 332, and 336 is made of a cobalt alloy. In addition, one or more of the magnetic recording sublayers 316, 320, 324, 328, 332, and 336 may further include one or more additional materials, such as those containing elements of platinum (Pt), Cr, boron (B), Ru, and/or combinations thereof.

In one aspect, each of the magnetic recording sublayers 316, 320, 324, 328, 332, and 336 includes magnetic grains embedded within a mixture of one or more oxide segregants. Suitable oxide segregants may include, but are not limited to, $SiO_2$, $TiO_2$, $Cr_2O_3$, $B_2O_3$, CoO, $Co_3O_4$, and/or combinations thereof. In some examples, the top magnetic recording sublayer 336 (MAG-6) may include at least the oxide segregant of $TiO_2$.

Each of the non-magnetic exchange control sublayers 318, 322, 326, 330, 334, and 338 can be made of one or more materials, such as CoRu and/or CoRuCr with an oxide segregant, such as $TiO_2$, or other suitable non-magnetic material.

In one embodiment, the magnetic recording layer structure 312 may also include a capping layer 326. In such case, the capping layer can be made of one or more materials such as Co, Pt, Cr, B, combinations thereof, and/or other suitable materials known in the art.

In one example, the thickness of the MAG-1 and MAG-6 sublayers may be between about twenty and sixty angstroms, whereas the thickness of the intermediate magnetic recording sublayers (e.g., MAG-2 through MAG-5) may be between about two and twenty angstroms.

Figure 6:
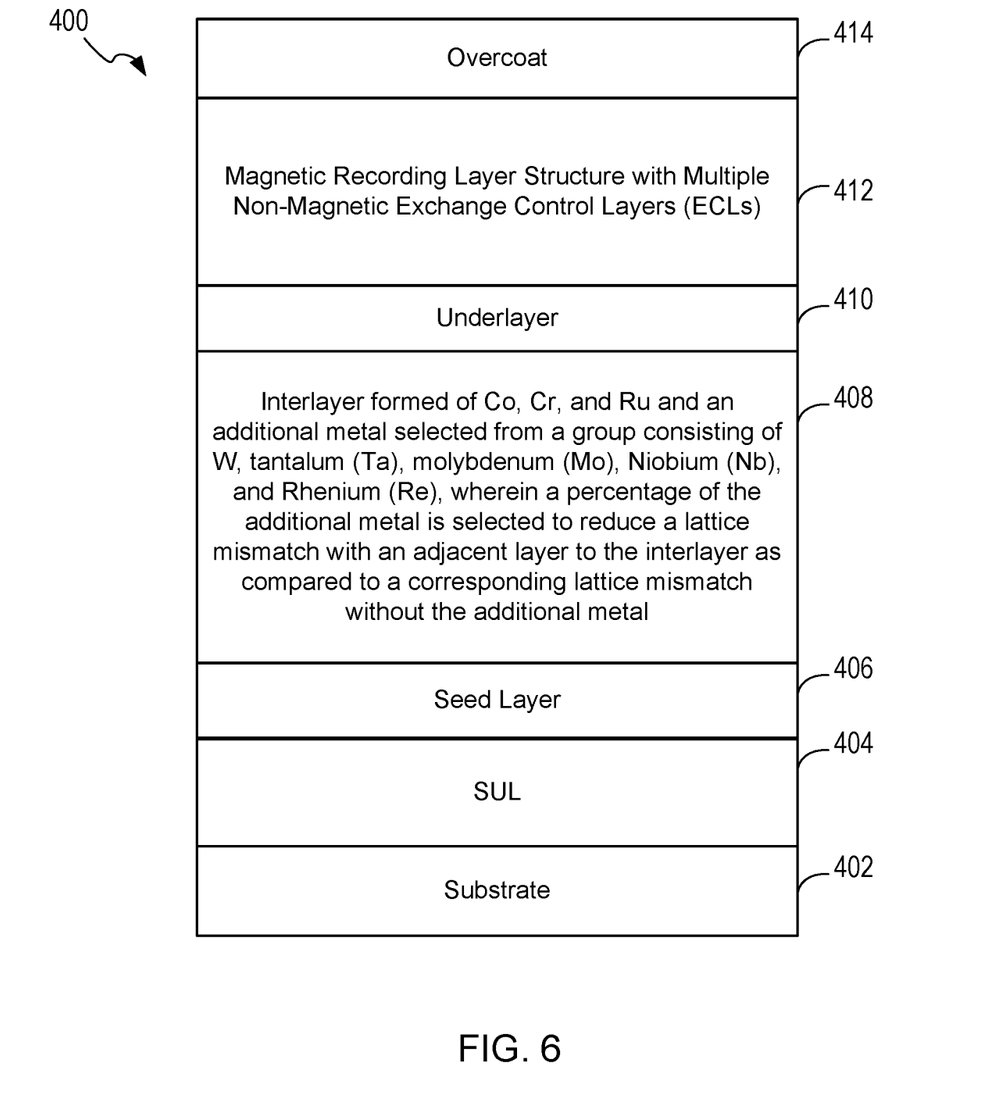
FIG. 6 is side cross-sectional schematic view of yet another magnetic recording medium having an interlayer configured to reduce lattice mismatch with adjacent layers in accordance with an embodiment of the disclosure.

FIG. 6 is side cross-sectional schematic view of another magnetic recording medium 400 that, in some embodiments, can be used in conjunction with the disk drive 100 of FIGS. 1 and 2. In sequence from the bottom, the magnetic recording medium 400 again includes a substrate 402, an SUL 404, a seed layer 406, an interlayer 408, an underlayer 410, a magnetic recording layer structure 412, and an overcoat layer 414. The magnetic recording layer structure 412 may have multiple magnetic layers and multiple non-magnetic exchange control layers.

The substrate 402 can be made of one or more materials such as an Al alloy, NiP-plated Al, glass, glass ceramic, and/or combinations thereof. The SUL 404 can be made of one or more materials, such as Co, Fe, Mo, Ta, Ni, B, Cr, or other soft magnetic materials, or combinations thereof. In one aspect, the SUL 404 may include an amorphous combination of Co, Fe, Mo, and Nb. The SUL 404 may be configured to support magnetization of the magnetic recording layer structure 412 during data storage operations. The seed layer 406 can be made of one or more materials, such as those containing elements of Ni, W, Fe, Cr, Al, combinations thereof, and/or other suitable materials known in the art. In one aspect, the seed layer 406 may include a combination of Ni, Fe, W, and Al.

The interlayer 408 may be formed of Co, Cr, and Ru and an additional metal selected from a group consisting of W, Ta, Mo, Nb, and Re, wherein a percentage of the additional metal is selected to reduce a lattice mismatch with an adjacent layer to the interlayer as compared to a corresponding lattice mismatch without the additional metal. In some examples, the interlayer is CoCrRuW with an atomic percentage of W in the CoCrRuW interlayer in the range of 2 to 10% and the atomic percentage of Ru is a least 25%. In some particular examples, the interlayer comprises a lattice of Co50Cr23Ru25W2 or Co45Cr25Ru25W5.

As noted above, it should be understood that not all of W, Ta, Mo, Nb, or Re will necessarily serve to reduce a lattice mismatch in a particular magnetic recording medium as compared to a lattice mismatch without the additional metal. Whether a particular metal additive reduces the lattice mismatch depends, e.g., on the materials and orientations of the adjacent layers to the interlayer and on the orientation of the interlayer. Routine experimentation may be performed to identify particular materials, atomic percentages, orientations, etc., that serve to achieve a reduction in lattice mismatch (e.g. a 5% reduction in lattice mismatch relative to an amount of lattice mismatch in the same medium without the additional metal). Given the materials of the adjacent layers and their orientations, a reduction in lattice mismatch cannot always be achieved. Above, particular metals, atomic percentages, and orientations are described that achieve a reduction in lattice mismatch in at least in some magnetic recording media.

Figure 7:
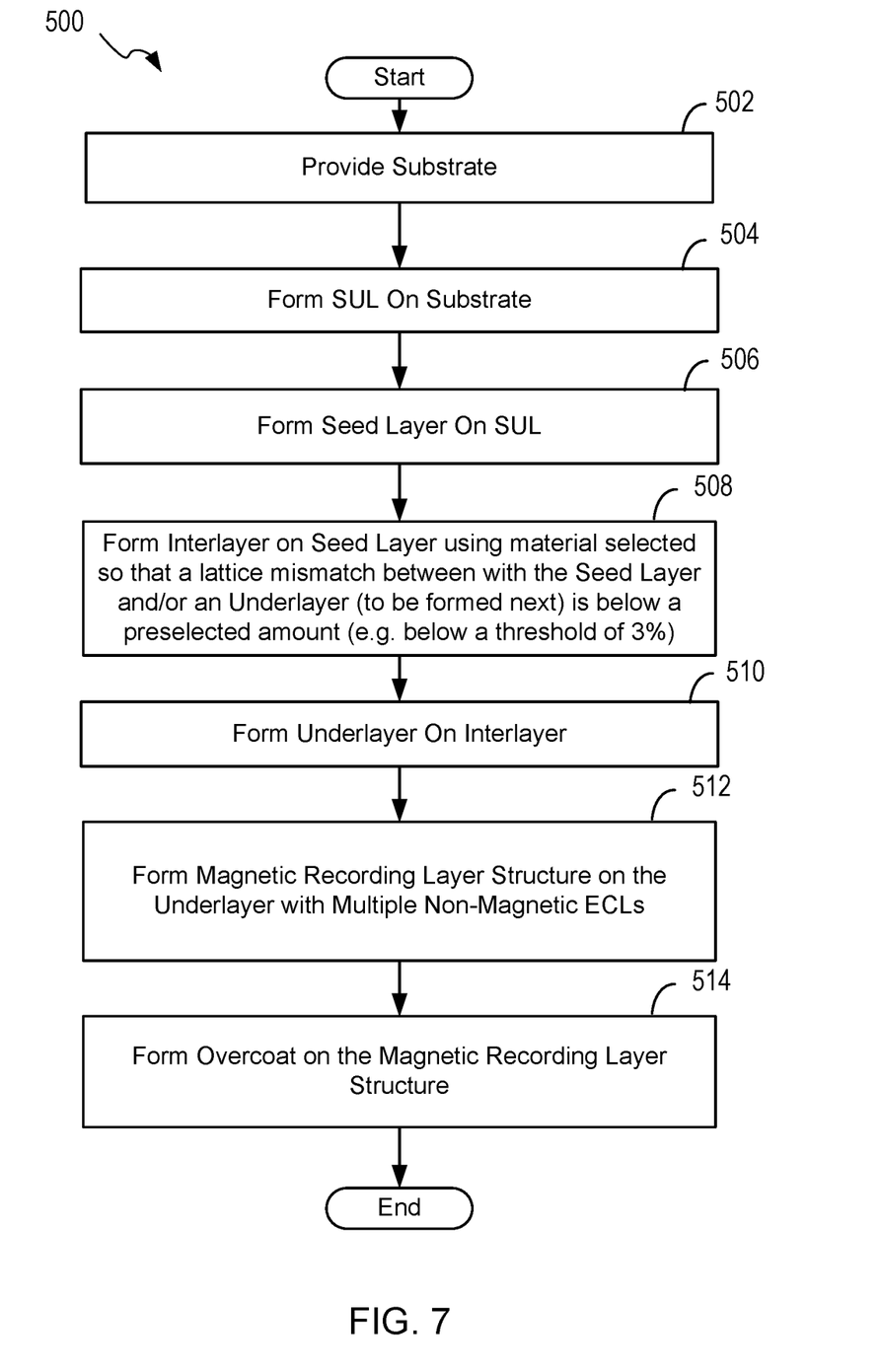
FIG. 7 is a flowchart of a process for fabricating a magnetic recording medium having an interlayer configured to reduce lattice mismatch with adjacent layers in accordance with an embodiment of the disclosure.

FIG. 7 is a flowchart of a process 500 for fabricating a magnetic recording medium including a magnetic recording layer structure. In particular embodiments, the process 500 can be used to fabricate the magnetic recording media described above including medium 102, medium 200 and/or medium 300. At block 502, the process provides a substrate. At block 504, a soft underlayer (e.g., SUL 204 in FIG. 3) is formed on the substrate. At block 506, a seed layer (e.g., seed layer 206 in FIG. 3) is formed on the underlayer. At block 508, an interlayer (e.g., interlayer 208 in FIG. 3) is formed on the seed layer using material selected so that a lattice mismatch with the seed layer and/or an underlayer (to be formed next) is below a preselected amount, such as below a threshold of 3%. As noted above, the lattice mismatch threshold between the interlayer and the underlayer may differ from the lattice mismatch threshold between interlayer and the seed layer. At block 510, an underlayer (e.g., underlayer 210 in FIG. 3) is formed on the interlayer. At block 512, a magnetic recording layer structure (e.g., structure 212 in FIG. 3) is formed on the underlayer where the magnetic recording layer structure has or includes multiple non-magnetic ECLs. At block 514, an overcoat (e.g., overcoat layer 214 in FIG. 3) is formed over the magnetic recording layer structure.

Figure 8:
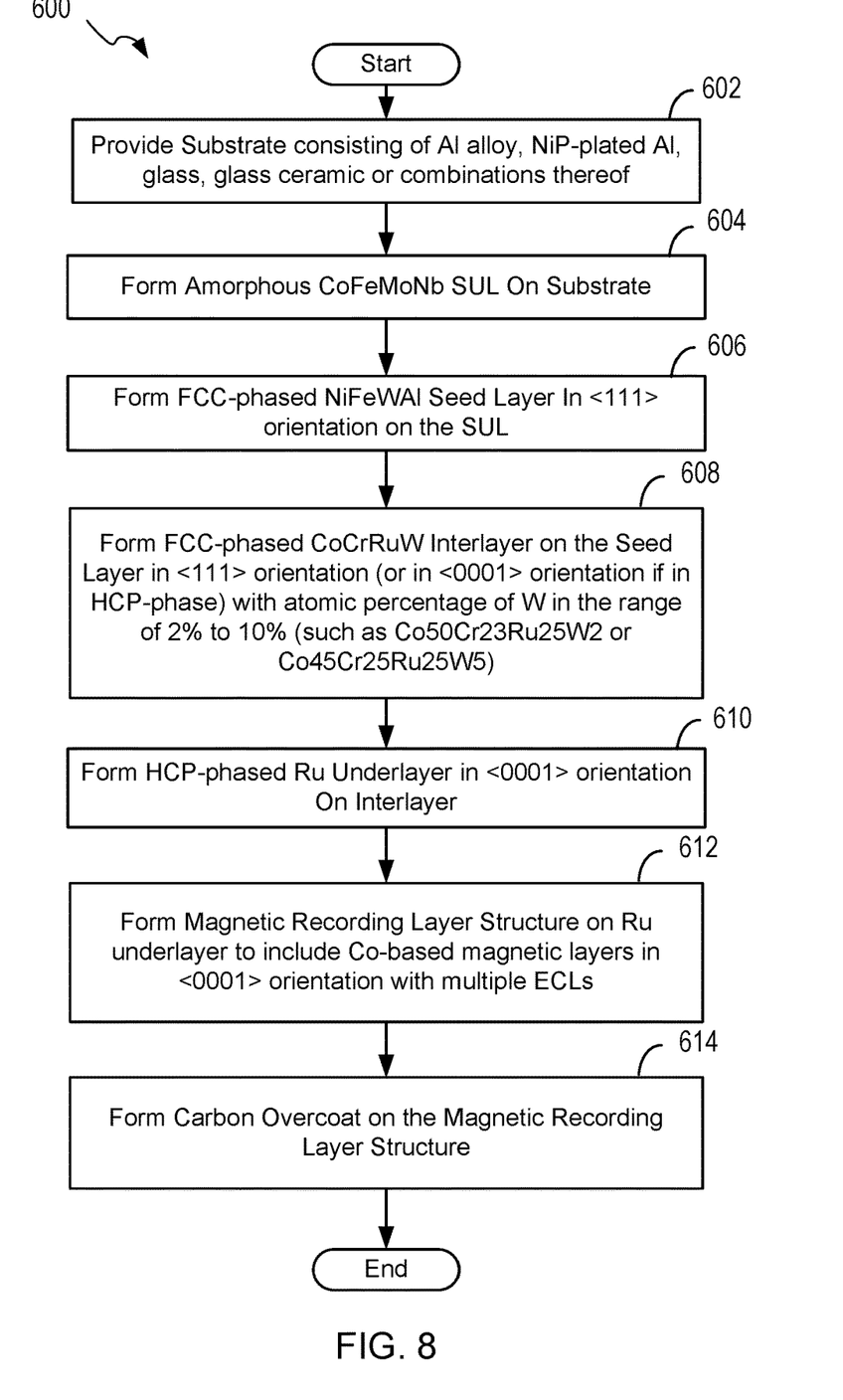
FIG. 8 is a flowchart of another process for fabricating a magnetic recording medium having an interlayer configured to reduce lattice mismatch with adjacent layers in accordance with an embodiment of the disclosure.

FIG. 8 is a flowchart of another process 600 for fabricating a magnetic recording medium including a magnetic recording layer structure. In particular embodiments, the process 600 can be used to fabricate the magnetic recording media described above including medium 102, medium 200 and/or medium 300. FIG. 8 is provided in part to illustrate further details regarding particular exemplary processes for forming or providing a magnetic recording media where a lattice mismatch between an interlayer and its adjacent layers is below a preselected amount. At block 602, the process provides a substrate formed of Al alloy, NiP-plated Al, glass, glass ceramic or combinations thereof. At block 604, a soft underlayer (e.g., SUL 304 in FIG. 4) is formed on the substrate where the SUL is amorphous CoFeMoNb. At block 606, a seed layer (e.g., seed layer 306 in FIG. 4) is formed on the SUL where the seed layer is formed as an FCC-phased NiFeWAl Seed Layer in <111> orientation.

At block 608, an interlayer (e.g., interlayer 308 in FIG. 4) is formed on the seed layer where the interlayer is formed as a FCC-phased CoCrRuW interlayer in <111> orientation (or in <0001> orientation if the interlayer is in an HCP phase) with atomic percentage of W in the range of 2% to 10% (such as Co50Cr23Ru25W2 or Co45Cr23Ru25W5) so that a lattice mismatch with the seed layer and/or an underlayer (to be formed next) is below a preselected amount, such as below a threshold of 3%. As noted above, the lattice mismatch threshold between the interlayer and the underlayer may differ from the lattice mismatch threshold between interlayer and the seed layer. At block 610, an underlayer (e.g., underlayer 310 in FIG. 4) is formed on the interlayer were the underlayer is an HCP-phased Ru underlayer in <0001> orientation. At block 612, a magnetic recording layer structure (e.g., structure 312 in FIG. 4) is formed on the underlayer where the magnetic recording layer structure is formed with Co-based magnetic layers in <0001> orientation and with multiple non-magnetic ECLs. At block 614, a carbon overcoat (e.g., overcoat 314 in FIG. 4) is formed over the magnetic recording layer structure.

Figure 9:
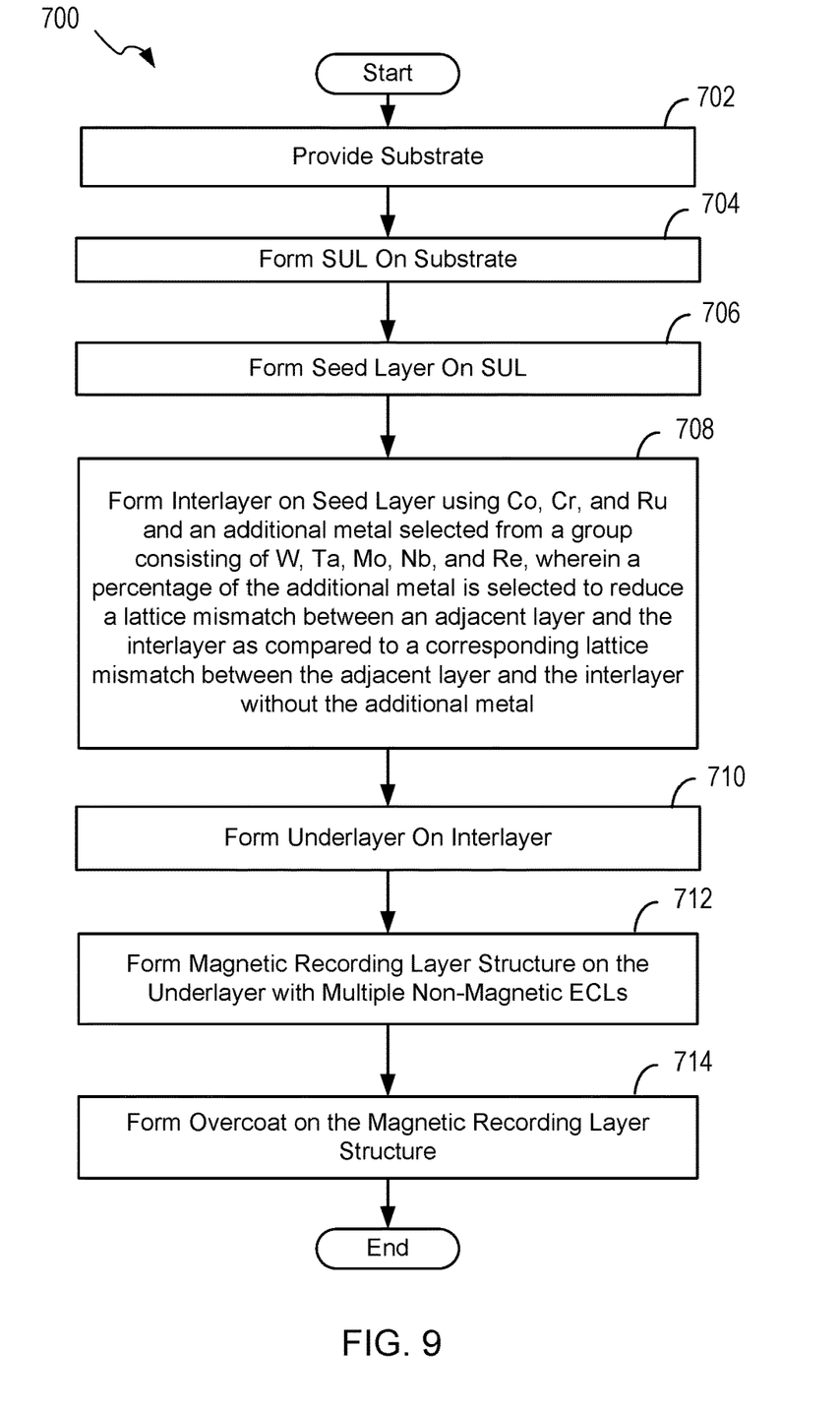
FIG. 9 is a flowchart of yet another process for fabricating a magnetic recording medium having an interlayer configured to reduce lattice mismatch with adjacent layers in accordance with an embodiment of the disclosure.

FIG. 9 is a flowchart of another process 700 for fabricating a magnetic recording medium including a magnetic recording layer structure. In particular embodiments, the process 700 can be used to fabricate the magnetic recording media described above including magnetic recording medium 400. At block 702, the process provides a substrate. At block 704, a soft underlayer (e.g., SUL 404 in FIG. 6) is formed on the substrate. At block 706, a seed layer (e.g., seed layer 406 in FIG. 6) is formed on the SUL. At block 708, an interlayer (e.g., interlayer 408 in FIG. 6) is formed on the seed layer using Co, Cr, and Ru and an additional metal selected from a group consisting of W, Ta, Mo, Nb, and Re, wherein a percentage of the additional metal is selected to reduce a lattice mismatch with an adjacent layer to the interlayer as compared to a corresponding lattice mismatch without the additional metal. At block 710, an underlayer (e.g., underlayer 410 in FIG. 6) is formed on the interlayer. At block 712, a magnetic recording layer structure (e.g., structure 412 in FIG. 6) is formed on the underlayer where the magnetic recording layer structure has or includes multiple non-magnetic ECLs. At block 714, an overcoat (e.g., overcoat layer 414 in FIG. 6) is formed over the magnetic recording layer structure.

In some embodiments, the processes herein can perform the sequence of actions in a different order. In other embodiments, the processes can skip one or more of the actions. In still other embodiments, one or more of the actions are performed simultaneously. In some embodiments, additional actions can be performed. For example, in one aspect, the process may include any additional actions needed to fabricate the magnetic recording layer structure.

In several embodiments, the forming or deposition of such layers can be performed using a variety of deposition sub-processes, including, but not limited to physical vapor deposition (PVD), direct current (DC) sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

While the above description contains many specific embodiments, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X," as used in the disclosure shall mean within 10 percent of the 'value X'. For example, a value of about 1 or approximately 1 would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X," with the meaning noted above.

What is claimed is:

1. A magnetic recording medium, comprising:
   a substrate;
   a seed layer on the substrate;
   an interlayer on the seed layer, wherein the interlayer includes cobalt (Co), chromium (Cr), ruthenium (Ru) and an additional metal selected from a group consisting of tungsten (W), tantalum (Ta), molybdenum (Mo), and Niobium (Nb), and wherein the atomic percentage of the Ru within the interlayer is at least 25%;
   an underlayer directly on the interlayer; and
   one or more magnetic recording layers on the underlayer, wherein the one or more magnetic recording layers comprises perpendicular magnetic anisotropy.

2. The magnetic recording medium of claim 1, wherein the interlayer comprises CoCrRuW with an atomic percentage of W in a range of 2% to 10%.

3. The magnetic recording medium of claim 2, wherein the interlayer comprises Co50Cr23Ru25W2 or Co45Cr25Ru25W5.

4. The magnetic recording medium of claim 1, wherein the underlayer comprises ruthenium (Ru).

5. The magnetic recording medium of claim 1, wherein the seed layer comprises nickel (Ni), iron (Fe), tungsten (W), and aluminum (Al).

6. The magnetic medium of claim 1, further comprising a soft underlayer (SUL), with the seed layer on the SUL and the SUL on the substrate.

7. The magnetic recording medium of claim 1, wherein the one or more magnetic recording layers comprise Co-based magnetic layers with multiple exchange control sublayers (ECLs).

8. A data storage device comprising the magnetic recording medium of claim 1.

9. The magnetic recording medium of claim 1, wherein a lattice mismatch between the interlayer and one or both of the seed layer and the underlayer is no greater than 3%.

10. A method for fabricating magnetic recording media, comprising:
    providing a substrate;
    providing a soft underlayer (SUL) on the substrate;
    providing a seed layer on the SUL;
    providing an interlayer on the seed layer, wherein the interlayer includes cobalt (Co), chromium (Cr), ruthenium (Ru) and an additional metal selected from a group consisting of tungsten (W), tantalum (Ta), molybdenum (Mo), and Niobium (Nb), and wherein the atomic percentage of the Ru within the interlayer is at least 25%;
    providing an underlayer directly on the interlayer; and
    providing one or more magnetic recording layers on the underlayer, wherein the one or more magnetic recording layers comprises perpendicular magnetic anisotropy.

11. The method of claim 10, wherein the interlayer comprises CoCrRuW with an atomic percentage of W in a range of 2% to 10%.

12. The method of claim 11, wherein the interlayer comprises Co50Cr23Ru25W2 or Co45Cr25Ru25W5.

13. The method of claim 10, wherein the underlayer comprises ruthenium (Ru).

14. The method of claim 10, wherein providing the seed layer comprises providing the seed layer to comprise a lattice of nickel (Ni), iron (Fe), tungsten (W), and aluminum (Al).

15. The method of claim 10, wherein providing the one or more magnetic recording layers comprises providing one or more Co-based magnetic layers with multiple exchange control sublayers (ECLs).

16. The method of claim 10, wherein the interlayer is provided so that a lattice mismatch between the interlayer and one or both of the seed layer and the underlayer is no greater than 3%.

17. A magnetic recording medium, comprising:
    a seed layer;
    an interlayer on the seed layer;
    an underlayer directly on the interlayer; and
    one or more magnetic recording layers on the underlayer, wherein the one or more magnetic recording layers comprises perpendicular magnetic anisotropy;
    wherein the interlayer comprises cobalt (Co), chromium (Cr), ruthenium (Ru) and an additional metal selected from a group consisting of tungsten (W), tantalum (Ta), molybdenum (Mo), and Niobium (Nb), and wherein the atomic percentage of the Ru within the interlayer is at least 25%.

18. The magnetic recording medium of claim 17, wherein the interlayer comprises CoCrRuW having an atomic percentage of W in a range of 2% to 10%.

19. The magnetic recording medium of claim 18, wherein the interlayer comprises Co50Cr23Ru25W2 or Co45Cr25Ru25W5.

20. A data storage device comprising the magnetic recording medium of claim 17.

21. The magnetic recording medium of claim 17, wherein a lattice mismatch between the interlayer and one or both of the seed layer and the underlayer is no greater than 3%.

22. The magnetic recording medium of claim 17, wherein a percentage of the additional metal in the interlayer is selected to reduce a lattice mismatch between the interlayer and one or both of the seed layer and the underlayer as compared to a corresponding lattice mismatch without the additional metal, and wherein the lattice mismatch between the interlayer and one or both of the seed layer and the underlayer is no greater than 3%.

23. A magnetic recording medium, comprising:
    a substrate;
    a seed layer on the substrate;
    an interlayer on the seed layer, wherein the interlayer includes cobalt (Co), chromium (Cr), ruthenium (Ru) and an additional metal selected from a group consisting of tungsten (W), tantalum (Ta), molybdenum (Mo), and Niobium (Nb), and wherein the atomic percentage of the Ru within the interlayer is at least 25%;
    an underlayer on the interlayer, wherein a lattice mismatch between the interlayer and one or both of the seed layer and the underlayer is no greater than 3%; and
    one or more magnetic recording layers on the underlayer, wherein the one or more magnetic recording layers comprises perpendicular magnetic anisotropy.

24. A magnetic recording medium, comprising:
    a seed layer;
    an interlayer on the seed layer;
    an underlayer on the interlayer; and one or more magnetic recording layers on the underlayer, wherein the one or more magnetic recording layers comprises perpendicular magnetic anisotropy;

wherein the interlayer comprises cobalt (Co), chromium (Cr), ruthenium (Ru) and an additional metal selected from a group consisting of tungsten (W), tantalum (Ta), molybdenum (Mo), and Niobium (Nb), wherein the atomic percentage of the Ru within the interlayer is at least 25%, wherein a lattice mismatch between the interlayer and one or both of the seed layer and the underlayer is no greater than 3%.

* * * * *